United States Patent
Martin et al.

[11] Patent Number: 5,424,043
[45] Date of Patent: Jun. 13, 1995

[54] PROCESS AND DEVICE FOR TREATING GASEOUS EFFLUENTS ISSUED FROM A CATALYTIC CRACKER

[75] Inventors: Gerard Martin, Rueil Malmaison; Jean-Louis Bouju, Luzarches, both of France

[73] Assignee: Institut Francais du Petrole and Babcock Enterprise, Malmaison, France

[21] Appl. No.: 187,137

[22] Filed: Jan. 27, 1994

Related U.S. Application Data

[63] Continuation of Ser. No. 865,342, Apr. 8, 1992, abandoned.

[30] Foreign Application Priority Data

Apr. 8, 1991 [FR] France ................. 91 04324

[51] Int. Cl.⁶ .................... B01D 53/34; B01J 8/08
[52] U.S. Cl. ........................ 422/171; 422/173; 422/144; 422/145; 422/146; 422/147; 110/252; 110/236
[58] Field of Search ................ 422/144–147, 422/168–171, 172–173; 110/236, 252, 261; 122/4 D

[56] References Cited

U.S. PATENT DOCUMENTS

| | | | |
|---|---|---|---|
| 3,176,634 | 6/1965 | Martin | 110/252 |
| 3,356,075 | 12/1967 | Livingston | 110/261 |
| 4,311,579 | 1/1982 | Bartholic | 422/144 |
| 4,547,351 | 10/1985 | Im et al. | 422/173 |
| 4,614,726 | 9/1986 | Walters et al. | 422/144 |
| 4,708,775 | 11/1987 | McGregor et al. | 110/236 |
| 4,738,829 | 4/1988 | Krug | 422/147 |
| 5,064,621 | 11/1991 | Uyama | 422/147 |

FOREIGN PATENT DOCUMENTS

| | | |
|---|---|---|
| 0129273 | 5/1984 | European Pat. Off. |
| 0200588 | 11/1986 | European Pat. Off. |
| 2636720 | 9/1988 | France |
| 2642663 | 1/1989 | France |
| 8503455 | 8/1985 | WIPO |

*Primary Examiner*—Robert J. Warden
*Assistant Examiner*—Hien Tran
*Attorney, Agent, or Firm*—Antonelli, Terry, Stout & Kraus

[57] ABSTRACT

A device for treating gaseous effluents from a catalytic cracking unit comprises at least one first stage for regenerating a catalyst used in a catalytic cracking process wherein the gaseous effluents issuing from a cracking catalyst regenerator are treated in a heat recovery unit (CR) including a treating chamber having an entrained bed. The absorbent introduced in this chamber has a "fine" grain size ranging between 0.1 and 100 μm and can be regenerated in the device downstream from heat recovery unit (CR).

10 Claims, 4 Drawing Sheets

PROCESS AND DEVICE FOR TREATING GASEOUS EFFLUENTS ISSUED FROM A CATALYTIC CRACKER

This application is a Continuation application of application Ser. No. 865,342, filed Apr. 8, 1992 now abandoned.

BACKGROUND OF THE INVENTION

The present invention relats to a process and a device for treating fumes issued from a catalytic cracker.

Fumes known as regeneration fumes (or effluents) issued from the catalysts used are produced during the catalytic cracking of hydrocarbon charges. These fumes contain pollutants, notably sulfur-containing ($SO_2$, $SO_3$, $H_2S$) and nitrogen-containing compounds and/or nitrates which have to be reduced or even totally removed because these pollutants are harmful to environment.

Numerous treatments have already been proposed for depolluting these fumes, notably for desulfurizing those effluents. A conventional way of treating such fumes consists in washing them after passage through heat exchangers. This technology requires heavy equipments and therefore represents a costly investment.

Another way of desulfurizing effluents issued from catalytic crackers consists no longer in utilizing a wet process, as described above, but in using a dry process, i.e. utilizing beds known as "circulating" beds. Patent applications FR-A-2,632,872 and FR-A-2,642,663 filed by the applicant show two designs based on the principle of the desulfurization of gaseous effluents in a circulating fluidized bed. The first application provides for the use of non regenerable absorbents such as limes or limestones; whereas the second application (FR-A-2,642,663) discloses the introduction of a regenerable absorbent in and absorption zone. A further step of regeneration of the used absorbent is then required, as well as steps of separation and recycling of the particles in the desulfurization zone.

In both of the above cited cases, the grain size of the absorbent mass ranges between 5 and 5000 micrometers and is preferably more than 100 $\mu m$.

This grain size requires the use of large-sized cyclones downstream from the treatment zone.

Besides, with such grain sizes, a minimum temperature of about 850° C. is required to obtain a sufficient decarbonatation velocity and efficiency.

Moreover, the thermal inertia of these reactors is considerable on account of the use of refractory materials.

Desulfurizing boilers known as "entrained bed boilers", i.e. with a pulverulent injection of the absorbent in the desulfurization zone, are more and more often used because, in relation to conventional desulfurizing boilers, such as those described above, such heat generators are less costly and easier to implement.

Patent applications FR-A-2,636,720 and EN. 90/08,311 filed by the applicant such prior art devices.

SUMMARY OF THE INVENTION

The present invention relates to a process and a device of the type defined heretofore by means of which, according to the invention, treating catalytic cracking effluents is achieved by a unit of the "entrained bed" type.

In relation to prior art, and notably to the deulfurization techniques utilizing circulating beds, the present invention affords the following advantages:

a substantial investment cut because there are no more large gas-solid separators (i.e. cyclones) at the outlet of the desulfurization chamber;

a decrease in the total pressure drop of the plant, notably due to the absence of cyclones and to the absence of a dense phase at the base of the desulfurization chamber; this advantage allows a lower operating cost;

a decrease in the thermal inertia, resulting from the absence of refractory materials, hence faster startings of the system; and an additional denitrification of the fumes.

The advantages stated above are thus obtained with a device for treating effluents of the type described heretofore, which comprises, according to the invention, a heat recovery unit CR comprising a chamber of the entrained bed type for treating the effluents, having at least one inlet for the effluents issuing from at least one of the regeneration stages.

The grain size of the absorbent mass used for the dsulfurization characteristically ranges about 0.1 and 100 micrometers.

The device according to the invention may advantageously comprise a means for decreasing the pressure of the gaseous effluents issuing from at least one of said regeneration stages, and a means for reheating said effluents between at least one of said regeneration stages and the treating chamber.

Heat recovery unit CR may also comprise a heat exchanger located downstream from the treating chamber, supplying a dust separator which comprises at least one first outlet for the clean fumes and a second outlet for the used absorbent, part of the used absorbent being recycled towards said treating chamber.

According to one embodiment of the invention, the treating chamber can be provided with at least one injector for a non regenerable absorbent, a storage tank for the non recycled part of the used absorbent being then provided.

According to another embodiment of the invention, the desulfurization chamber may be provided with at least one inlet for a regenerable absorbent.

The device according to the invention then preferably comprises a means for regenerating said absorbent.

The means for regenerating the absorbent may particularly comprise an absorbent regenerator of the fluidized bed type, a separator and/or a heat exchanger.

In all the cases considered above, a device for mixing the fresh absorbent and the absorbent recycled towards the desulfurization chamber can be advantageously provided upstream from the desulfurization chamber.

The catalytic cracker may comprise two regeneration stages, one working in the presence of excess air and the other one of insufficient air, without departing from the scope of the invention.

In such an embodiment, the device according to the invention further comprises an incinerator located upstream from the desulfurization chamher, supplied by the oxidizing fumes issuing from the second regeneration stage and the reducing flames issuing from the first regeneration stage.

According to another aspect thereof, the invention aims at providing a process which can be implemented by the device defined above.

According to the invention, the process for treating the gaseous effluents essentially consists in:

separately introducing into a heat recovery unit CR absorbent particles of a grain size ranging between 0.1 and 100 μm and said gaseous effluents;

contacting, at the level of a treatment chamber of the entrained bed type being part of said recovery unit, the effluents and the absorbent particles;

separating the desulfurized fumes from the particles of used absorbent.

BRIEF DESCRIPTION OF THE DRAWINGS

Other features and advantages of the invention will be clear from reading the description hereafter given by way of non limitative example, with reference to the accompanying drawings in which.

DESCRIPTION OF THE PREFERRED EMBODIMENTS

Figure 1:
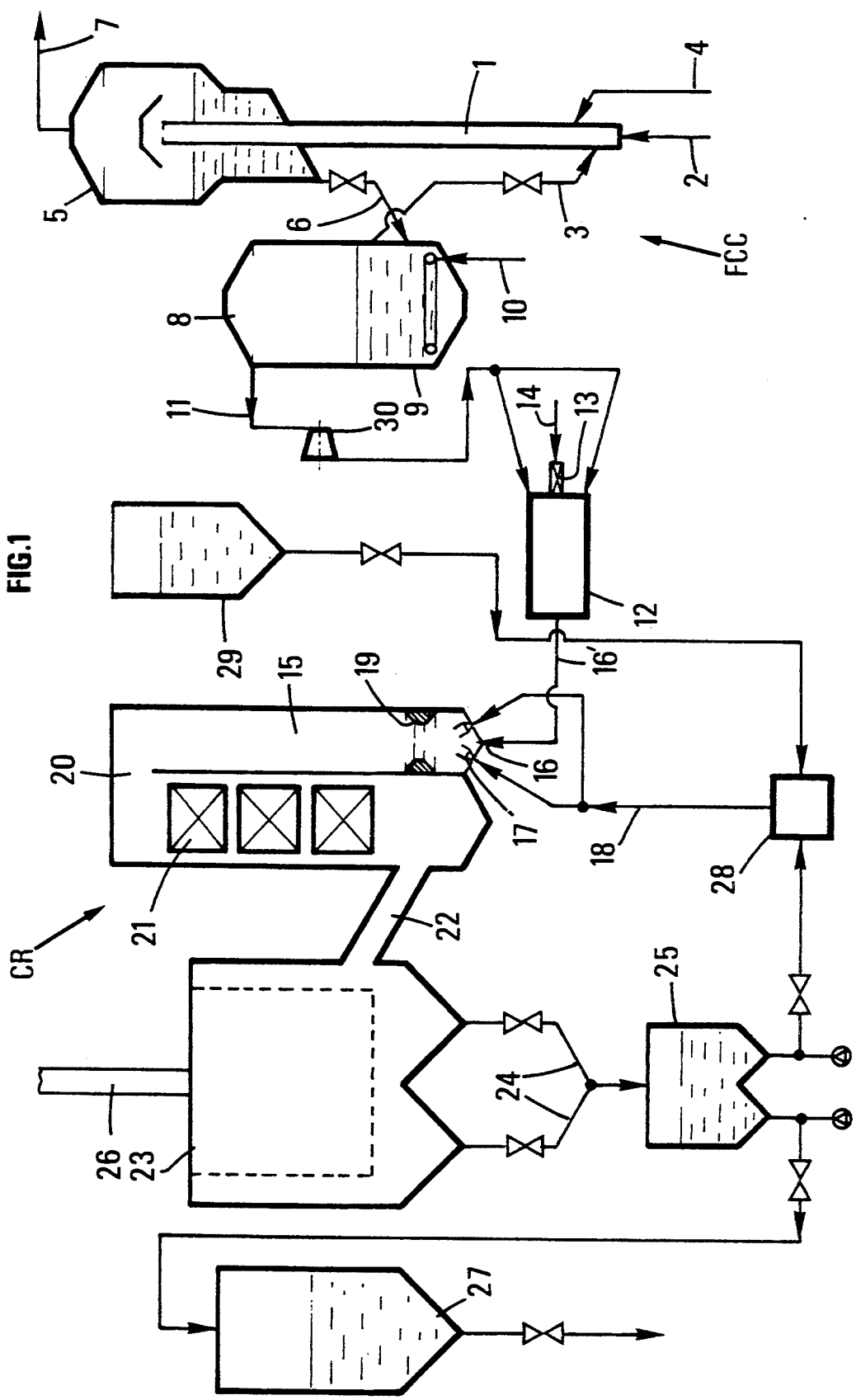
FIG. 1 diagrammatically shows, according to a first embodiment of the invention, a device for treating the effluents, FIGS. 2, 3 and 4 each show respectively a second, third and fourth embodiment of the invention.

FIG. 1 shows a device comprising an FCC catalytic cracker with a single regeneration stage working in total oxidation, which a recovery boiler CR provided wtih a desulfurization chamhber utilizing non regenerable masses is associated with.

FCC catalytic cracker comprises a riser 1, or catalyst-lifting pipe, at the bottom of which the charge to be treated (line 4), the catalyst (line 3) and the catalyst precarrying steam (line 2) are injected. The resulting mixture circulates upwardly in the riser. The upper end of the riser opens in a stripper 5 in which the catalyst and the cracked hydrocarbons are separated. The catalyst is fed into regenerator 8 through line 6, while the cracked hydrocarbons leave the stripper through line 7 and are sent for example towards a fractionating tower. The coke which has deposited on the catalyst during the cracking step is burned in a fluidized bed 9 supplied with combustion air through a line 10. The regenerated catalyst is fed into cracking riser 1 through line 3.

According to the invention, the fumes resulting from the regeneration of the catalyst are conveyed through a line 11 towards a desulfurization chamber 15.

A pressure reducer 30 and a reheating device 12 are preferably respectively located on line 11. Pressure reducer 30 allows the fumes to decrase to a pressure close to atmospheric pressure while reheating device 12 allows the fumes to enter desulfurization chamber 15 with an optimum temperature.

In reheating device 12, the fumes resulting from the regeneration of the catalyst are admixed with the effluents from one or several burners 13 supplied with fuel through a line 14.

The amount of fuel introduced into desulfurization chamber 15 is adjusted in such a way that the average temperature in said chamber located downstream from this reheating chamber 12 ranges between 750° and 1250° C., preferably between 800° and 1000° C. The connection between reheating device 12 and desulfurization chamber 15 can be achieved downstream from device 12 by means of a line 16', as shown in FIG. 1, but it is also possible for these two chambers to have a shared wall, the fumes transfer thus directly occurring through a communicating port. Any device 16 known in itself can be used as a means for introducing the effluents.

Absorbent injectors 17 are preferably located in the vicinity of the point of introduction of the fumes in the desulfurization chamber. This end of the desulfurization chamber may also be equipped with devices 19 favouring the mixing of the absorbent with the fumes. In the case of FIG. 1, the fumes and the absorbent circulate upwards in the desulfurization chamber and pass thereafter through passageway 20 into a zone equipped with tubular exchangers 21.

This circulation mode is not imperative, and configurations with the fumes-absorbent mixture flowing downwards can also be considered. The cooled fumes leave the boiler through a line 22 and are sent towards a final dust separator 23. The fumes or gases from which the dust has been removed leave dust separator 23 through a line 26 which conveys the fumes, for example, towards a chimney (not shown).

The used absorbent leaves the final dust separator through one or several lines 24 through which it is sent towards an intermediate storage hopper 25. From hopper 25, the used absorbent is partly or totally transferred into a final discharge hopper 27. The recycled absorbent fraction is fed into a device 28 where is is admixed with the fresh absorbent from a hopper 29. Installing mixer 28 is not imperative, and separate injections can be considered for the fresh absorbent and for the recycled absorbent.

Figure 2:
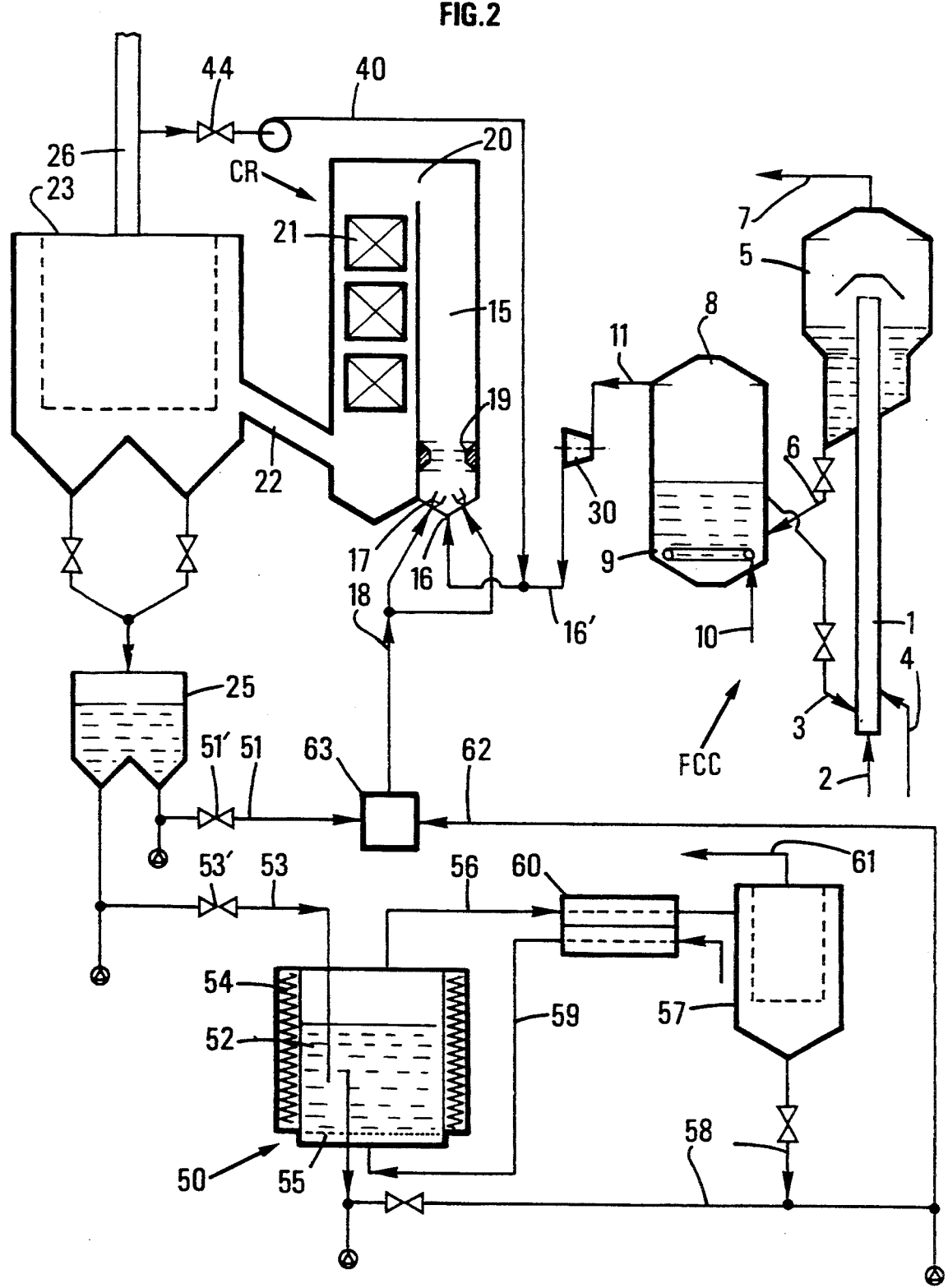

FIG. 2 shows the association of an FCC cracker comprising a single regenerator working in total oxidation with a recovery boiler CR equipped with a desulfurization chamber 15 utilizing regenerable masses. FCC cracker is identical to that of FIG. 1. Only the differences in relation to the device shown in FIG. 1 will be described hereafter. Besides, identical elements will be marked with a single reference numeral in all the figures of the present invention.

After expanding in device 30, the fumes circulating in line 11 are directly sent into desulfurization chamber 15 through a line 16'. The injectors 17 located near the inlet of desulfurization chamber 15 allow to introduce the regenerable absorbent according to this embodiment.

In the usual working conditions of FCC crackers, the temperature of the fumes issuing from regenerator 9 is generally close to the temperature required for an optimum running of desulfurization chamber 15. The fumes can thus be directly injected into desulfurization chamber 15, from expansion device 30. The optimum temperature in chamber 15 preferably ranges between 500° C. and 700° C. In the particular cases where an adjustment of the fumes temperature is necessary, a reheating operation can be achieved by a reheating device (such as 12 shown in FIG. 1). On the contrary, if cooling the fumes from regenerator 9 turns out to be necessary, cooled fumes taken from line 26 for discharging the dedusted fumes will be injected. A bypass 40 between discharge line 26 and line 16' can be provided to that effect. Besides, a valve 44 can be placed on bypass 40 in order to control the rate of flow of the recycled cold fumes.

The two modes for adjusting the temperature of the fumes described above are of course not limitative.

After a substantially upward path in desulfurization chamber 15, the fumes and the absorbent are transferred into the zone where tubular heat exchangers 21 are located, after passing through passageway 20. The mixture is evacuated out of the desulfurization unit through line 22 which sends it towards dust separator 23.

At the outlet of the final dust separator 23, at the level of inner storage hopper 25, a fraction of the absorbent can be directly recycled into desulfurization chamber 15 through a line 51 preferably comprising a control valve 51'. The other part of the absorbent is thereafter sent towards an absorbent regeneration means 50 via a line 53 preferably comprising a control valve 53'. This means 50 essentially comprises an absorbent regenerator 52 preferably equipped with means 54 for reheating the absorbent, in order to bring it up to a temperature ranging between 400° and 1000° C., preferably between 550° and 750° C.

The reducing gas used for regenerating the absorbent may be for example hydrogen, methane, hydrogen sulfide, propane, butane, etc.

Absorbent regenerator 52 may be for example a fluidized bed system as shown in FIG. 2. This type of implementing is still not limitative.

The device 55 used in absorbent regenerator 52 for supplying the regeneration gas consists for example of several injectors.

The regenerated absorbent can be extracted by entrainment with the regeneration gases via a line 56 and recovered in a dust separator 57. If need be, the absorbent can also be extracted by gravitational withdrawal by means of a line 58 immersed in the fluidized bed. the regeneration gases are conveyed to the fluidized bed through a line 59, after being optionally preheated in a gas-gas exchanger 60 which allows to recover the sensible heat of the regeneration gases and of the solids entrained, after utilizing them in the fluidized bed.

If the regeneration of the absorbent has led to a significant coke deposition on said absorbent, it can be removed by combustion in an appropriate device which is not shown in FIG. 2. This device can for example be located on lines 56 or 58 according to the mode of extraction of the regenerated absorbent from regenerator 52. Another option consists in successively achieving the operations of regeneration of the absorbent and of combustion of the deposited coke in device 52.

After passing through dust separator 57, the regeneration gases laden with sulfur-containing products leave the plant through a line 61 through which they can be conveyed towards sulfur cleaning and upgrading equipments (Claus plant for example). The regenerated absorbent can be sent towards a mixing devices 63 via a line 62. In mixer 63, the regenerated absorbent is admixed with the non regenerated absorbent and the mixture thereof is finally conveyed towards desulfurization chamber 15 via a line 18. As in the first embodiment of the invention, mounting the mixer is not imperative and the regenerated absorbent can be injected into the desulfurization chamber apart from the non regenerated absorbent.

Besides, in order to prevent the sulfur oxides absorbent from being contaiminated by solids issuing from the catalystic cracker, and more particularly by catalyst fines, connection 11 can be equipped with high-performance dust separators (tertiary cyclones for example). These devices are not shown in FIG. 2.

Figure 3:
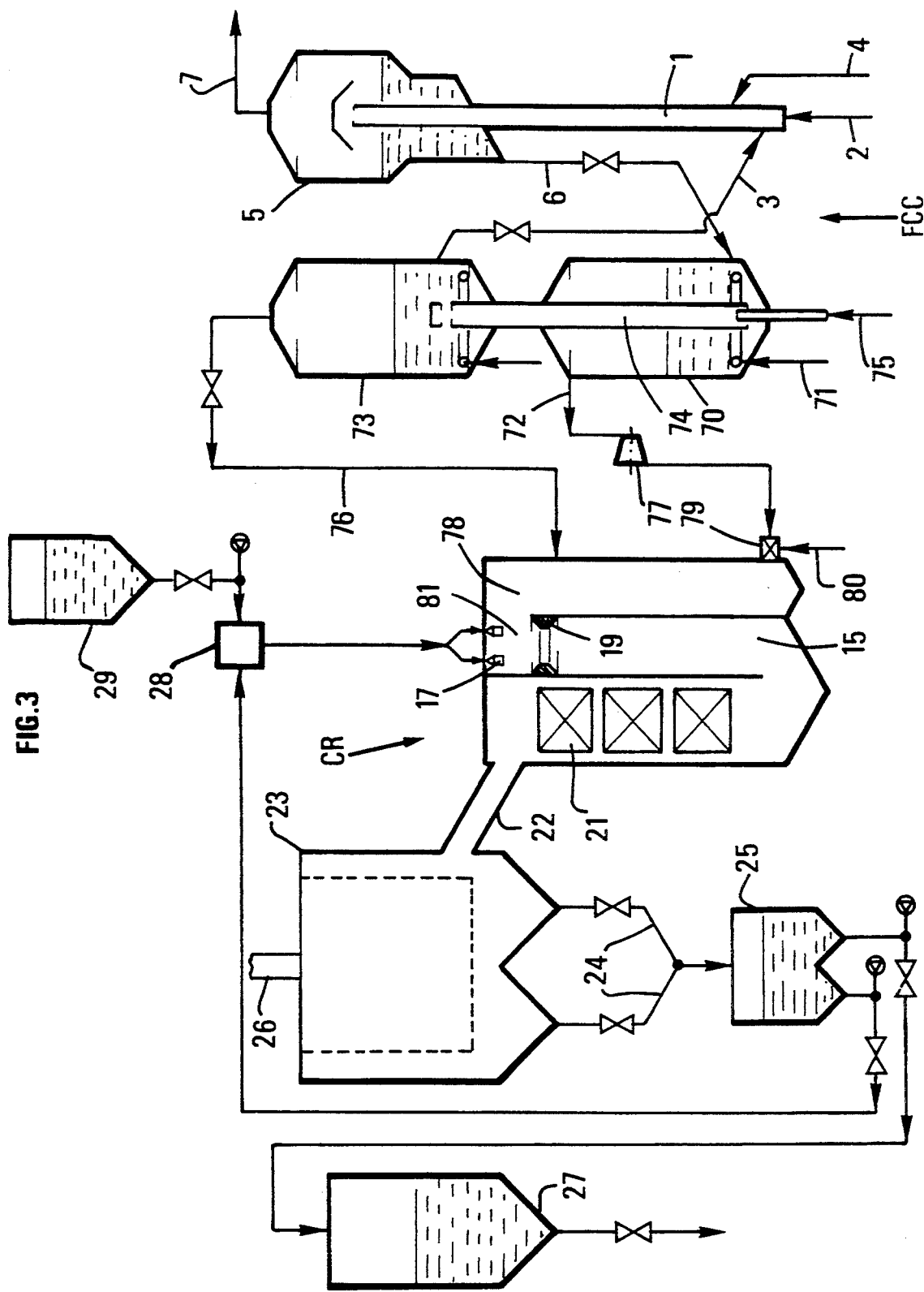

FIG. 3 shows a device according to the invention comprising a cracker with two regeneration stages 70, 73 associated with a boiler equipped with a desulfurization chamber working with a non regenerable absorbent. According to this figure, the configuration of cracker 1 is the same as that described in FIG. 1. Only the regeneration part is modified. The used cracking catalyst conveyed from stripper 5 through line 6 is fed into a first regenerator 70 supplied with air through a specific line 71. The first regenerator 70 preferably works in the presence of insufficient air and produces fumes containing gaseous unburned components ($H_2$, $CH_4$, CO, . . . ) which have to be incinerated before being introduced into the desulfurization chamber. These first reducing fumes are discharged through a line 72. The catalyst partly regenerated in the first regenerator 70 is transferred into a second regenerator 73 through a riser 74 which is supplied with air through a line 75. The second regenerator 73 workds in the presence of excess air. The fumes issuing from this regenerator are discharged through a line 76. They are oxidizing.

The fumes issuing from the first regeneration stage can be expanded in a specific device 77 (valve, turbine, etc, known in itself) and sent thereafter into an incineration chamber 78 equipped witn an adapted burner 79. In order to perform the operation, additional fuel conveyed through a line 80 can be introduced into burner 79 to obtain a final incineration temperature ranging between 900° and 1300° C. The additional energy can also be provided by burners independent of the device for introducing the fumes into incineration chamber 78. The fumes coming from the second regeneration stage and conveyed through line 76 are added to the incineration fumes just before leaving incineration chamber 78. The flow rate of auxiliary fuel conveyed through line 80 is adjusted so as to obtain an average temperature is desulfurization chamber 15 ranging between 750° and 1250° C., preferably between 800° and 1000° C. The mixture leaving incineration chamber 78 is fed into desulfurization chamber 15. Absorbent injectors 17 are arranged close to the inlet 81 of said chamber and, as previously, devices 19 favouring the mixing of the absorbent with the fumes can be installed in this zone.

After passing (downwardly, according to this embodiment) through desulfurization chamber 15, the fumes and the absorbent preferably enter a zone equipped with heat exchangers 21 intended to lower the temperature thereof before leaving boiler CR.

Downstream from the boiler, the treament of the fumes-absorbent mixture and thus the associated plant is identical to that described for the first embodiment of the invention. This plant and the operation thereof will therefore not be described hereafter.

Figure 4:
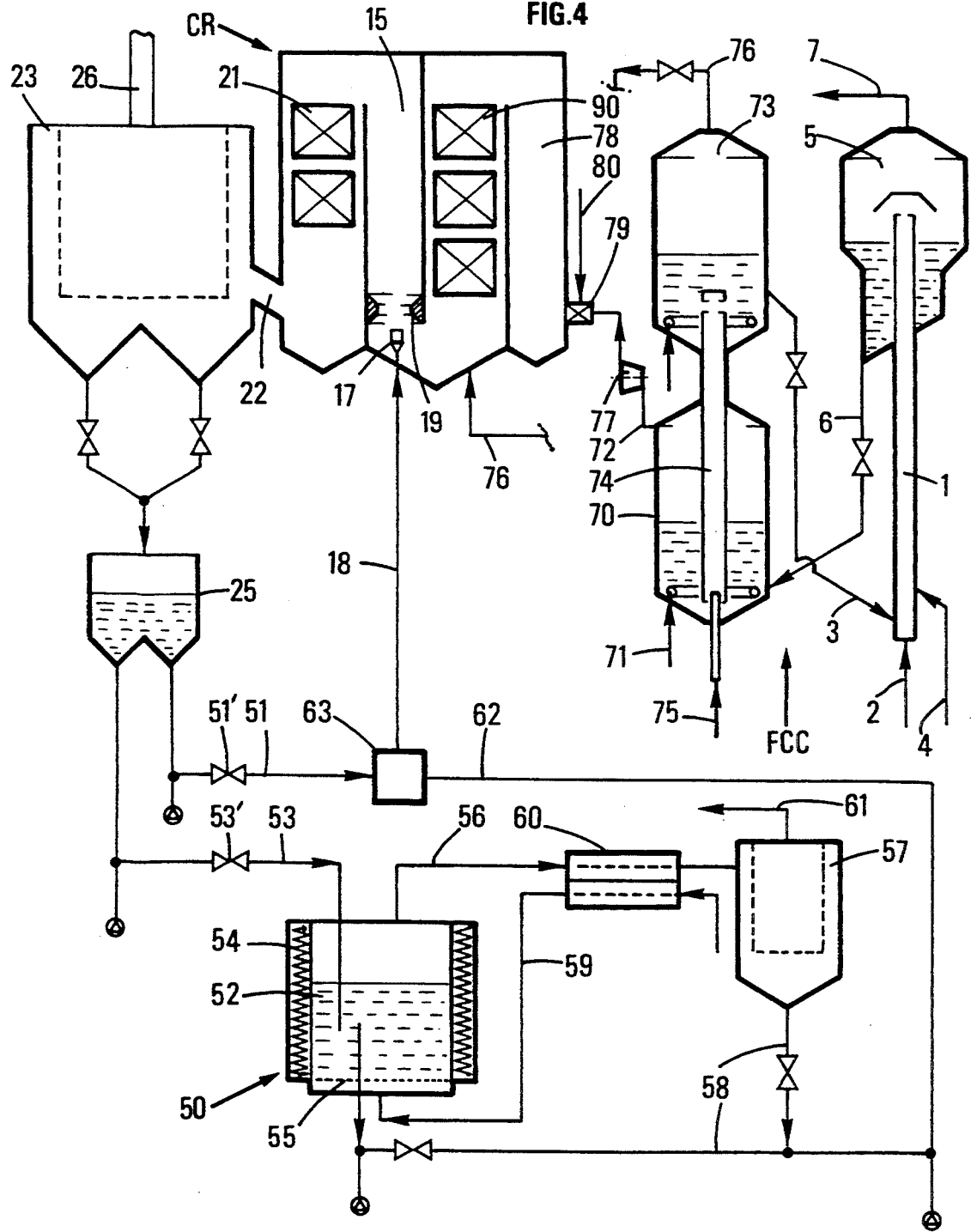

The effluent treating unit may comprise, as shown in FIG. 4, an FCC catalystic crackier with two regeneration stages associated with a boiler comprising a desulfurization chamber working with regenerable absorbents without departing from the scope of the invention. The catalytic cracker is identical to that described with respect to FIG. 3.

Besides, according to this embodiment of the invention, it may be desirable to provide a zone 90 equipped with heat exchangers between incineration chamber 78 and desulfurization chamber 15.

In this case, the fumes from the first regeneration stage 70 are injected as described above, by means of at least one burner 79, into incineration chamber 78, while the fumes from the second regeneration stage 73 are added to the main flow of fumes at the outlet of heat exchange zone 90 via pipe 76.

Pipe 76 could open in incineration chamber 78 without departing from the scope of the invention; the choice essentially depends on the temperature selected in the different chambers.

The temperature of the fumes at the outlet of this zone 90, i.e. at the inlet of desulfurization chamber 15, advantageously ranges between 500° and 800° C. The absorbent is introduced, as mentioned before, in pulverulent form at the inlet of the desulfurization chamber by means of one or several injectors 17.

If need be, the temperature in desulfurization chamber 15 can be lowered by a flow of cold umes (not shown) derived from final chimney 26.

According to the embodiment of the invention shown in FIG. 4, the absorbent is regenerated in an appropriate means 50 such as that described for example with respect to FIG. 2.

More precisely, concerning the working conditions of desulfurization chamber 15, it should be added that the residence time of the fumes in this chamber ranges between 0.5 and 5 seconds, preferably between 1 and 2 seconds.

Besides, the usual average absorbent concentrations in the fumes leaving the desulfurization chamber range between 5 and 500 g/m$^3$, preferably between 20 and 100 g/m$^3$.

Finally, the non regenerable absorbents used can be selected among calcic products (limes, limestones) or among products having a high calcium carbonate content (raw cement products for example).

As for the regenerable absorbents, magnesium oxide-based products have been successfully used. Components facilitating the fixation of sulfur oxides (cerium oxides, noble metals for example) can advantageously be added to the regenerable absorbents cited above in order to make the fixation of sulfur oxides easier.

The invention further allows to perform treatments for denitrifying the fumes by injecting another type of absorbent at the level of desulfurization chamber 15. This absorbent will preferably have a grain size allowing the entrained bed circulation thereof in said chamber 15.

Valves or any other means likely to control the rate of flow in the different lines of the device according to the invention can be provided, as shown in the figures. The number and the location thereof are determined according to the specific used planned.

Other modifications and/or additions can be brought by those skilled in the art to the process and the device which have been described without departing from the scope of the present invention.

We claim:

1. A device for treating gaseous effluents from a FCC catalytic cracker comprising at least one catalytic regeneration unit for receiving catalyst from an FCC catalytic cracker and for producing gaseous effluents containing pollutants during regeneration of the catalyst, said device further comprising a heat recovery unit comprising an effluent treating chamber having an entrained bed formed therein and having at least one inlet in fluid communication with the at least one catalytic regeneration unit for receiving gaseous effluents issuing from the at least one catalytic regeneration unit, means connected to said effluent treating chamber for introducing particulate absorbent into said effluent treating chamber to form the entrained bed of particulate absorbent and said gaseous effluents and to effect removal of the pollutants from said gaseous effluents within said entrained bed, wherein said at least one catalytic regeneration unit comprises a first stage catalytic regeneration unit for receiving said catalyst from the FCC cracker and having air inlet means operating with insufficient air to complete regeneration of the catalyst, and gas outlet means for discharging reducing effluent gases a second stage catalytic regeneration unit in fluid communication with said first stage catalytic regeneration unit for receiving catalyst from the first stage catalytic regeneration unit, said second stage catalytic regeneration unit having air inlet means oeprating with excess air to complete regeneration of the catalyst and gas outlet means for discharging oxidized effluent gases, and an incinerator located upstream from the effluent treating chamber, said incinerator comprising a vertical chamber, means connecting an upper portion of the vertical chamber to the gas outlet means of the second stage catalytic regeneration unit for introducing the oxidized effluent gases from the second stage catalytic regeneration unit to the upper portion of the vertical chamber, and means connecting a bottom portion of the vertical chamber to the gas outlet means of said first stage catalytic regeneration unit for introducing the reducing effluent gases issuing from the first stage catalytic regeneration unit to the lower portion of the vertical chamber for incinerating unburned components in the gaseous effluents received from the first stage catalytic regeneration unit before the reducing effluent gases are sent to the effluent treating chamber.

2. A device as claimed in claim 1, wherein said heat recovery unit further comprises a heat exchanger located downstream from the upper portion of the vertical chamber in relation to the direction of the effluent gas flow.

3. A device as claimed in claim 1, wherein said incinerator further comprises means connected to the bottom of the vertical chamber for introducing fuel therein.

4. A device as claimed in claim 1, wherein said means for introducing particulate absorbent into said effluent treating chamber comprises at least one inlet for particulate absorbent arranged at an end of the effluent treating chamber adjacent to the at least one inlet for receiving the gaseous effluents and wherein the grain size of said particulate absorbent ranges between 0.1 and 100 micrometers.

5. A device as claimed in claim 1, wherein means for introducing the reducing effluent gases from the first stage catalytic regeneration unit has further comprising a pressure reduction means for lowering pressure of the gaseous effluents issuing from the first stage catalytic regeneration unit.

6. A device as claimed in claim 1, wherein said heat recovery unit (CR) further comprises a heat exchanger located downstream from the effluent treating chamber in relation to a direction of flow of the gaseous effluents within said heat recovery unit, said heat exchanger being connected to a dust separator for supplying the dust separator with a mixture of absorbent and gaseous effluents produced in the entrained bed, said dust separator comprising at least one first outlet for cleaned fumes and a second outlet for used absorbent, part of the used absorbent being recycled towards said effluent treating chamber.

7. A device as claimed in claim 1, wherein the particulate absorbent introduced into said effluent treating chamber is a non-regeneratable absorbent, said device further comprising separating means arranged downstream from the effluent treating chamber, in relation to the direction of the effluent gas flow for separating a portion of the absorbent introduced into said effluent treating chamber and entrained with gaseous effluents.

8. A device as claimed in claim 1, further comprising means connected to the effluent treating chamber for recovering absorbent discharged from the effluent treating chamber and means connected to said recovering means for regenerating the absorbent recovered from the effluent treating chamber.

9. A device as claimed in claim 8, wherein said means for regenerating the absorbent comprises an absorbent regenerator informed of a fluidized bed.

10. A device as claimed in any one of claims 8 or 9, wherein said means for regenerating the absorbent further comprises an outlet for discharging the regenerated absorbent particles, said outlet of said regenerating means being connected with said means for introducing the absorbent into the effluent treating chamber.

* * * * *